United States Patent [19]

Berger et al.

[11] Patent Number: 5,547,039

[45] Date of Patent: Aug. 20, 1996

[54] SECURITY AND SAFETY INTERLOCKS FOR A LOADER

[75] Inventors: John G. Berger, Landisville; Robert E. Long, Lancaster; Darryl T. Leeds, Wrightsville, all of Pa.

[73] Assignee: New Holland North America, Inc., New Holland, Pa.

[21] Appl. No.: 348,910

[22] Filed: Nov. 25, 1994

[51] Int. Cl.⁶ .................................................. B60R 25/00
[52] U.S. Cl. .......................................... 180/287; 307/10.2
[58] Field of Search ..................... 180/271, 273, 180/287, 272; 307/10.2, 10.4; 340/426, 667

[56] References Cited

U.S. PATENT DOCUMENTS

| | | | |
|---|---|---|---|
| 3,303,836 | 2/1967 | Burleigh | 180/273 |
| 4,844,196 | 7/1989 | Clevenger et al. | 180/273 |
| 4,852,680 | 8/1989 | Brown et al. | 307/10.2 |
| 5,006,843 | 4/1991 | Hauer | 180/287 |
| 5,396,216 | 3/1995 | Morgan | 307/10.3 |

*Primary Examiner*—Eric D. Culbreth
*Assistant Examiner*—Paul N. Dickson
*Attorney, Agent, or Firm*—Griffin, Butler, Whisenhunt & Kurtossy

[57] ABSTRACT

A front end loader is provided with a seat switch that is closed when an operator sits in a seat and a seat belt switch that is closed when a seat belt is fastened. Closure of the seat switch enables a programmable controller which begins executing a program. The program repetitively checks the status of the seat and seat belt switches and enables the hydraulic controls for the boom and bucket only if (1) the seat belt switch is not closed at the time the operator sits in the seat and (2) subsequent to sitting in the seat the operator fastens the seat belt. The system makes it inconvenient for an operator to defeat the purpose of the seat belt by fastening it and sitting on it since, on each entry into the operator's cab, the operator must unbuckle the seat belt before sitting in the seat in order to enable the boom and bucket controls. To deter theft, the operator may lower the boom and bucket to engage the ground and then enter any two-digit lock code using two manual switches. Once a lock code has been entered, the boom and bucket hydraulic controls are disabled until the operator follows a specific procedure and again enters the same two-digit lock code.

12 Claims, 7 Drawing Sheets

SECURITY AND SAFETY INTERLOCKS FOR A LOADER

FIELD OF THE INVENTION

The present invention relates to front end loaders and more specifically to a locking control for preventing the engine from running and preventing movement of the hydraulically actuated boom and bucket to thereby deter theft or unauthorized use of the loader.

BACKGROUND OF THE INVENTION

Loaders are frequently left unguarded at a job site and, because of their size, it is a relatively simple matter to steal a loader by driving it onto a small trailer and hauling it away. Theft or unauthorized use is further simplified because an operator may frequently forget to remove the ignition key when he leaves the loader. Therefore, it is desirable to provide some means for deterring theft or unauthorized use of a loader even though the ignition key is available for starting the loader.

SUMMARY OF THE INVENTION

An object of the invention is to provide a method and apparatus for deterring theft or unauthorized use of a loader even though the ignition key is available to start the loader engine.

Another object of the invention is to provide a method and apparatus for deterring theft or unauthorized use of a loader by providing the locking system into which an operator may enter a locking code before leaving the loader, the locking system inhibiting the boom and bucket hydraulic controls and the flow of fuel to the engine.

In accordance with the invention, the operator locks the loader by first lowering the boom and tilting the bucket so that the bucket engages the ground. Next, the operator actuates switches to enter a locking code, selected at random at the time it is entered. A programmable controller responds to actuation of the switches to store the locking code in a non-volatile memory. As long as a locking code is stored, the program executed by the programmable controller inhibits the boom and bucket hydraulic controls and the flow of fuel to the engine. The engine will start by turning the ignition key but it soon stops because of the lack of fuel. This, coupled with the fact that the bucket engages the ground and cannot be raised, makes it difficult to move the loader. A stored locking code is replaced by an unlock code by actuating the switches to again enter the same code as the stored locking code.

Other objects of the invention and the manner of making and using it will be obvious from a consideration of the following description and the accompanying drawings.

DETAILED DESCRIPTION OF THE INVENTION

Figure 1:
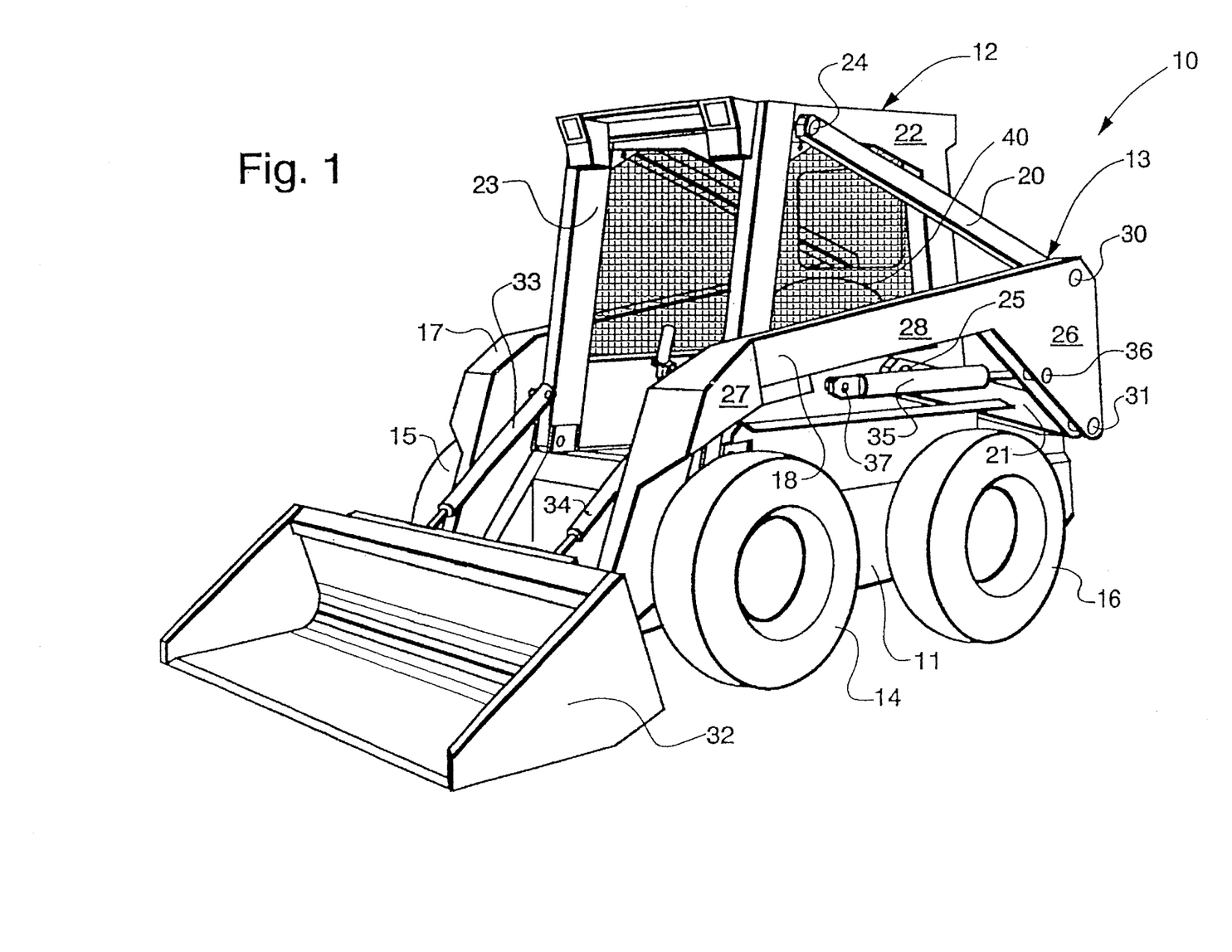
FIG. 1 is a perspective view of a loader in which the present invention may be utilized.

FIG. 1 shows a loader 10 of the type with which the present invention may be used. The loader 10 has a chassis 11 supporting an operator's cab 12 that is open at the front to permit entry and egress of an operator. The chassis is supported on four wheels with the wheels 14, 15 and 16 only being visible in FIG. 1.

The loader is provided with a boom comprising two boom arms 17 and 18, each arm extending along one side of the loader. The boom arm 18 is supported by two linkage bars 20 and 21 which are connected to the framework of the cab by pivot connections 24 and 25 and connected to the boom arm 18 by pivot connections 30 and 31. The boom arm 18 is raised and lowered by actuation of a hydraulic piston and cylinder 35 which is connected to the boom and cab framework by pivot connections 36 and 37.

The boom arm 17 is supported in the same manner as boom arm 18. A bucket 32 is pivotally attached to the front end of boom arms 17 and 18. Two bucket hydraulic cylinder and piston arrangements 34 and 33 are pivotally attached between the bucket 32 and the framework of the cab 12 so that the bucket may be pivoted about a horizontal axis extending transverse to the front-to-rear axis of the loader.

The loader is provided with two foot pedals, not shown. One pedal moves a first spool valve 75 (FIG. 2) to control the flow of hydraulic fluid to boom cylinders 35 to raise or lower the boom arms, and the other pedal moves a second spool valve 77 to control the flow of hydraulic fluid to the bucket cylinders 33, 34 to tilt the bucket.

The loader is powered by a diesel engine 73 (FIG. 2) that is supported on chassis 11 at the rear of the operator's cab 12.

Figure 2:
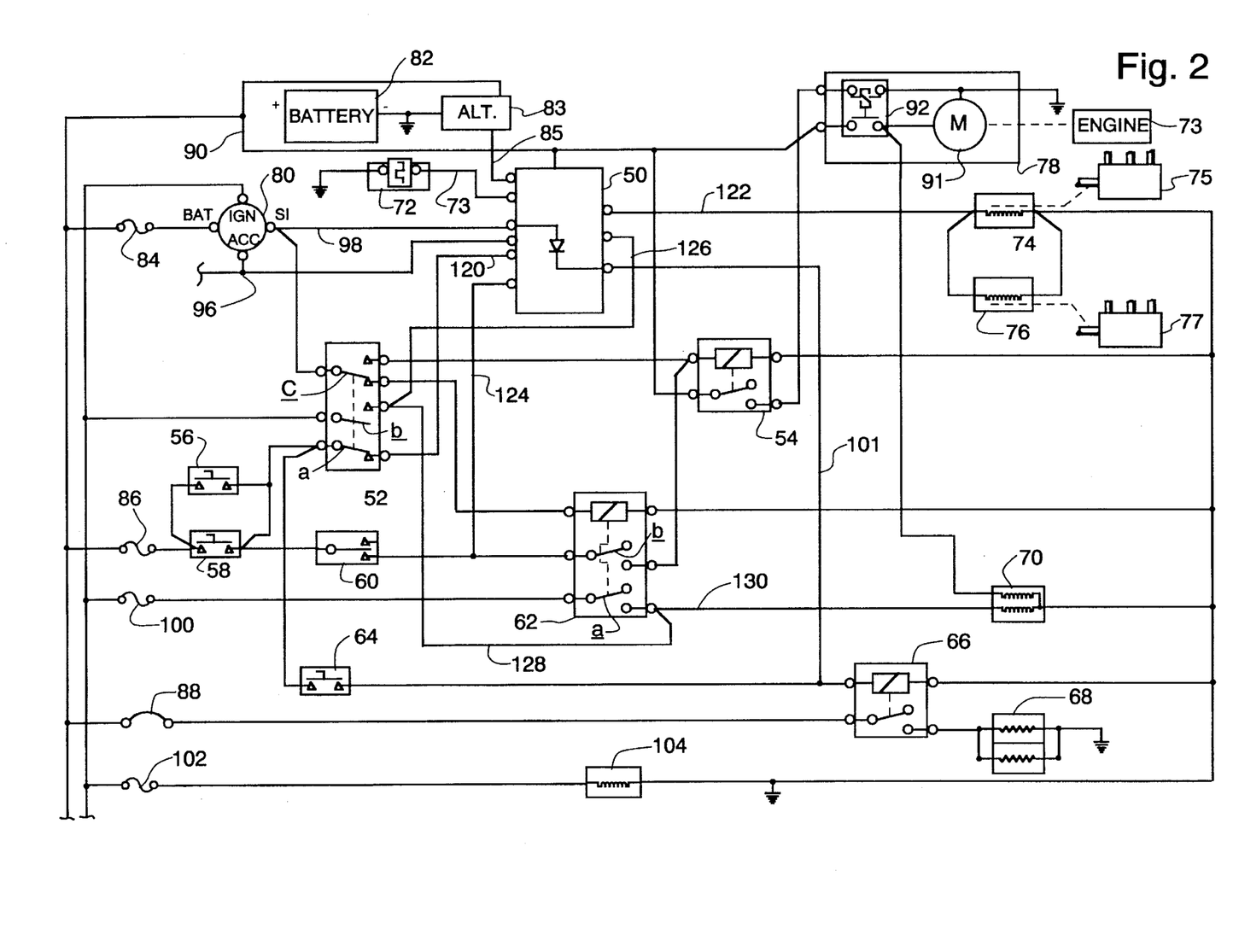
FIG. 2 is a schematic diagram of the electrical circuit for the loader.

As shown in FIG. 2, the electrical system of the loader 10 comprises an Electronic Instrumentation Cluster (EIC) 50, a run/service switch 52, a start relay 54, two seat switches 56 and 58, a seat belt switch 60, an interlock relay 62, a preheat switch 64, a preheat relay 66, resistive heaters 68, a fuel control solenoid 70, a sender 72 for sensing engine temperature, a boom solenoid 74 for selectively inhibiting movement of the spool in spool valve 75 which controls the flow of hydraulic fluid to the boom cylinders, a bucket solenoid 76 for selectively inhibiting movement of the spool in spool valve 77 which controls the flow of hydraulic fluid to the bucket cylinder, a starter 78 having a starter solenoid 92 and a starter motor 91, an ignition switch 80, a battery 82, and an alternator 83 which also serves as an engine speed sensor.

The EIC 50 includes a Motorola MC68HC11A1FN microprocessor 106 (FIG. 3) having RAM, ROM and E²PROM memories, a 5-position, 7-segment liquid crystal alphanumeric display 108, lamps 109 for back-lighting various warning or condition indicator symbols on an operator's control panel, controllers 110 for controlling the display 108 and lamps 109 in accordance with signals applied to the controllers from the microprocessor, a piezoelectric audible alarm or beeper 112, and two manually actuated push switches 114 and 116 designated the Right Arrow and Open-Book switches, respectively because the switches are overlaid with a template carrying these symbols. Although not shown in the drawing for sake of clarity, the EIC includes conventional voltage level shifters for adapting +12

Figure 3:
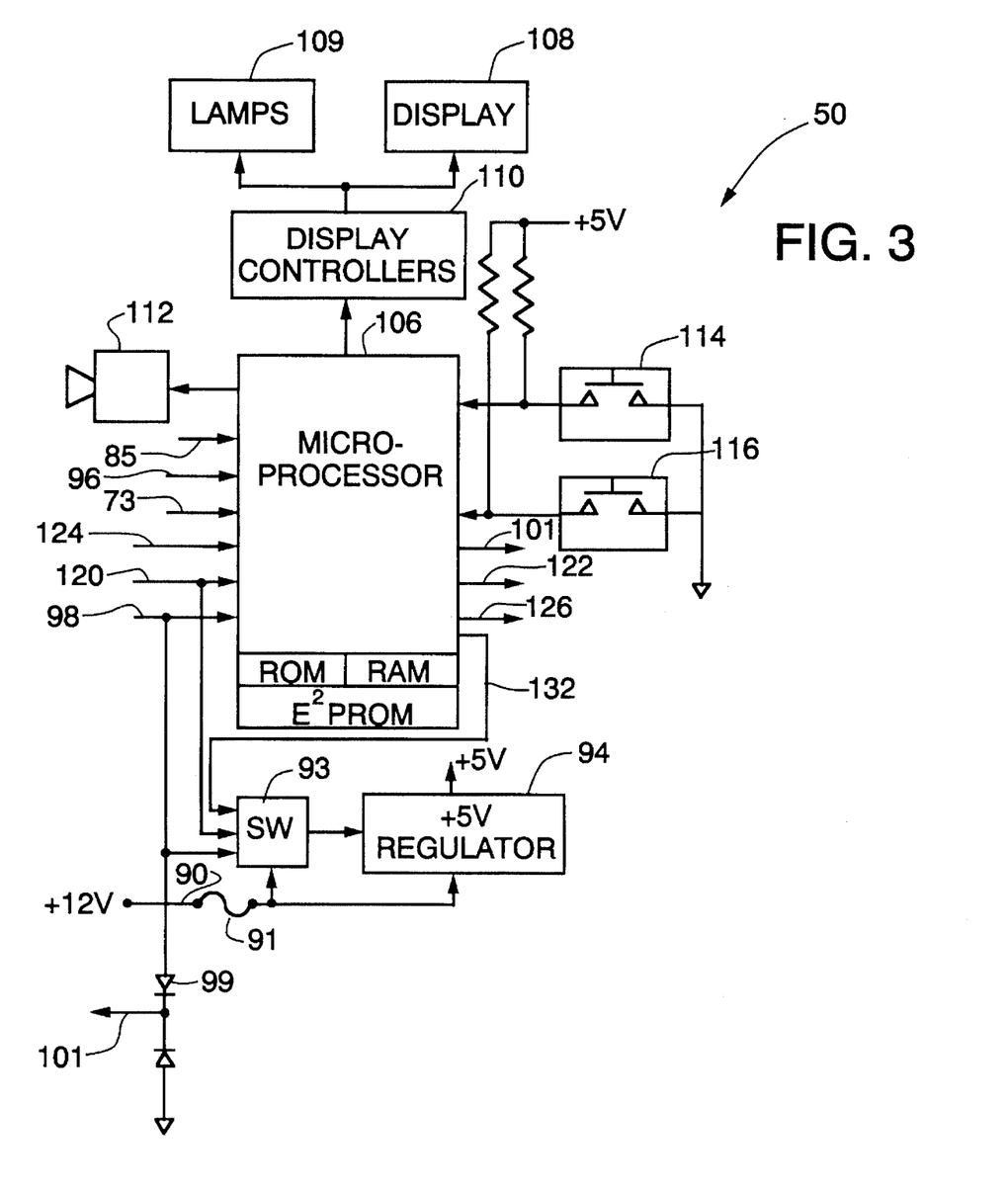
FIG. 3 is a diagram of the circuits with the Electronic Instrument Cluster of FIG. 2.

V signals received by the EIC into signal levels suitable for application to the input buses of the microprocessor 106 and various input and output registers.

The switches 114 and 116 control several functions including the entry of a two-digit security code to lock or unlock the loader as subsequently described. The switch 114 controls entry of the most significant digit of the security code and switch 116 controls entry of the least significant digit.

The EIC 50 also includes a voltage regulator 94 which provides +5 V for powering the logic circuits within the EIC. Regulator 94 produces the +5 V output only when it is enabled by a transistor switch 93. The switch 93 responds to a signal on lead 98 or lead 120 to turn on the regulator and thus enable the microprocessor 106 and other elements of the EIC as subsequently described. Once power is applied to the microprocessor and it begins executing its program, the microprocessor produces an output signal on lead 132 to keep switch 93 on as long as (1) the ignition switch 80 is on, (2) the seat belt switch 60 is closed, or (3) at least one of the seat switches 56, 58 is closed.

In FIG. 2, the battery 82 is a +12 V battery which supplies electrical power for the loader 10 in conjunction with alternator 83. The positive terminal of the battery is connected through a fuse 84 to an input terminal of ignition switch 80, through a fuse 86 to one terminal of the seat switches 56, 58, and through a circuit breaker 88 to the operating contact of preheat relay 66. The battery 82 is also connected via a lead 90 to a contact of starter solenoid 92, to the operating contact of start relay 54, and to the EIC 50. In the EIC, the battery voltage provides power to transistor switch 93 (FIG. 3) and the regulator 94.

The ignition switch 80 is a conventional key-operated switch having an OFF position (not shown) which isolates the battery voltage from all of the switch output terminals and an ACC position in which the battery voltage is applied over a lead 96 to an input of microprocessor 106 and various lights, signalling devices and accessories, not shown. The ignition switch also has a start (ST) position and an ignition (IGN) or run position. The switch is spring biased so that if the switch is moved from the OFF position, through the run position, to the start position, and then released, the switch moves back to the run position. The accessories also receive battery power when the ignition switch is in the run position.

When the ignition switch 80 is in the start position, the battery voltage is applied over a lead 98 to the microprocessor 106 and transistor switch 93 within EIC 50, and to operating contact c̲of the run/service switch 52. Within EIC 50 (see FIG. 3) the lead 98 is connected through a diode 99 to a lead 101. In FIG. 2, the lead 101 is connected to the coil of preheat relay 66.

In both the start and run positions of ignition switch 80, the battery voltage is applied through the switch to a second operating contact b̲of the run/service switch 52, through a fuse 100 to an operating contact a̲of the interlock relay 62, and through a fuse 102 to the coil of fuel pump 104.

The run/service switch 52 is illustrated in the "run" position in FIG. 2. In this position the loader engine will start and the hydraulic circuits are operable to permit movement of the bucket 32 and boom arms 17, 18 provided other conditions are met as subsequently described. In the "service" position the engine will start but the boom and bucket hydraulic system is inoperative.

The seat switches 56 and 58 are located within the seat 40 in which the operator sits, the back rest of the seat being visible in FIG. 1. The switches 56 and 58 are connected in parallel and are closed when an operator is seated in the seat. The seat belt switch 60 is located in a seat belt buckle which is attached to the loader frame. The seat belt switch closes when the operator inserts one end of the seat belt into the buckle. As subsequently explained, the loader engine cannot be started when the run/service switch is in the run position unless the operator is sitting on the seat and has fastened the seat belt so that switches 56, 58 and 60 are closed.

The preheat switch 64 is a manually actuated switch located within reach of the operator. If the operator is seated in the seat to close seat switches 56, 58, actuation of switch 64 will permit battery voltage to be applied through switches 56, 58 and 64 to the coil of preheat relay 66.

Figure 4A:
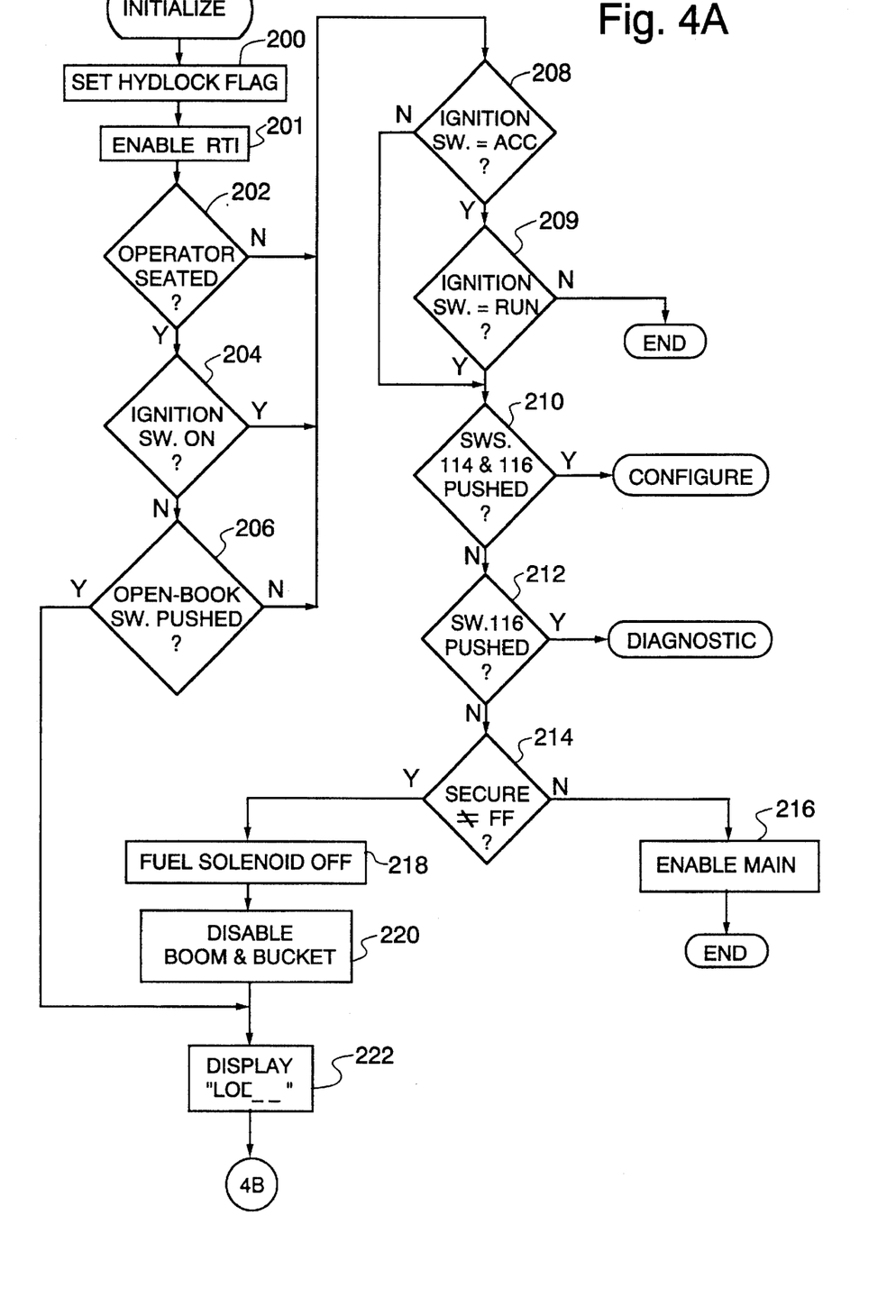
FIGS. 4A and 4B comprise a flow diagram of an Initialize routine executed by the microprocessor of FIG. 3.
Figure 4B:
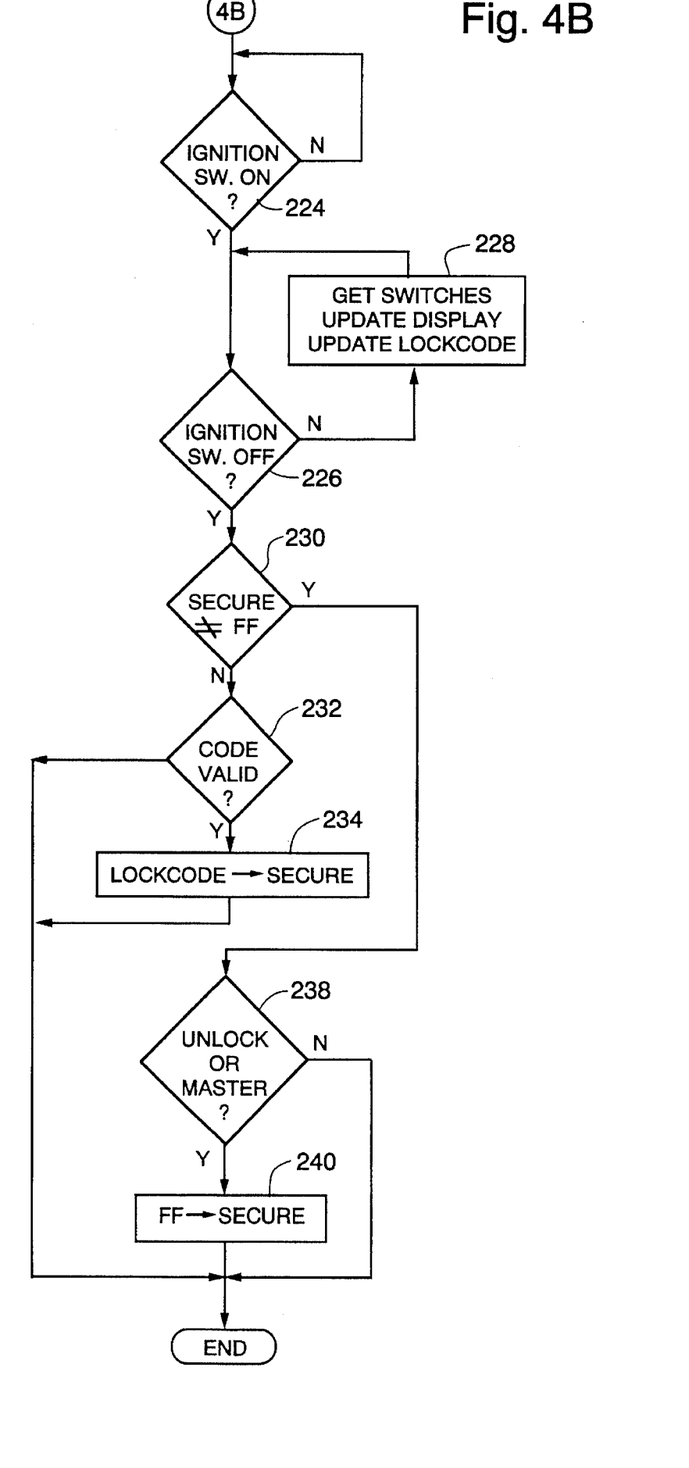
Figure 5:
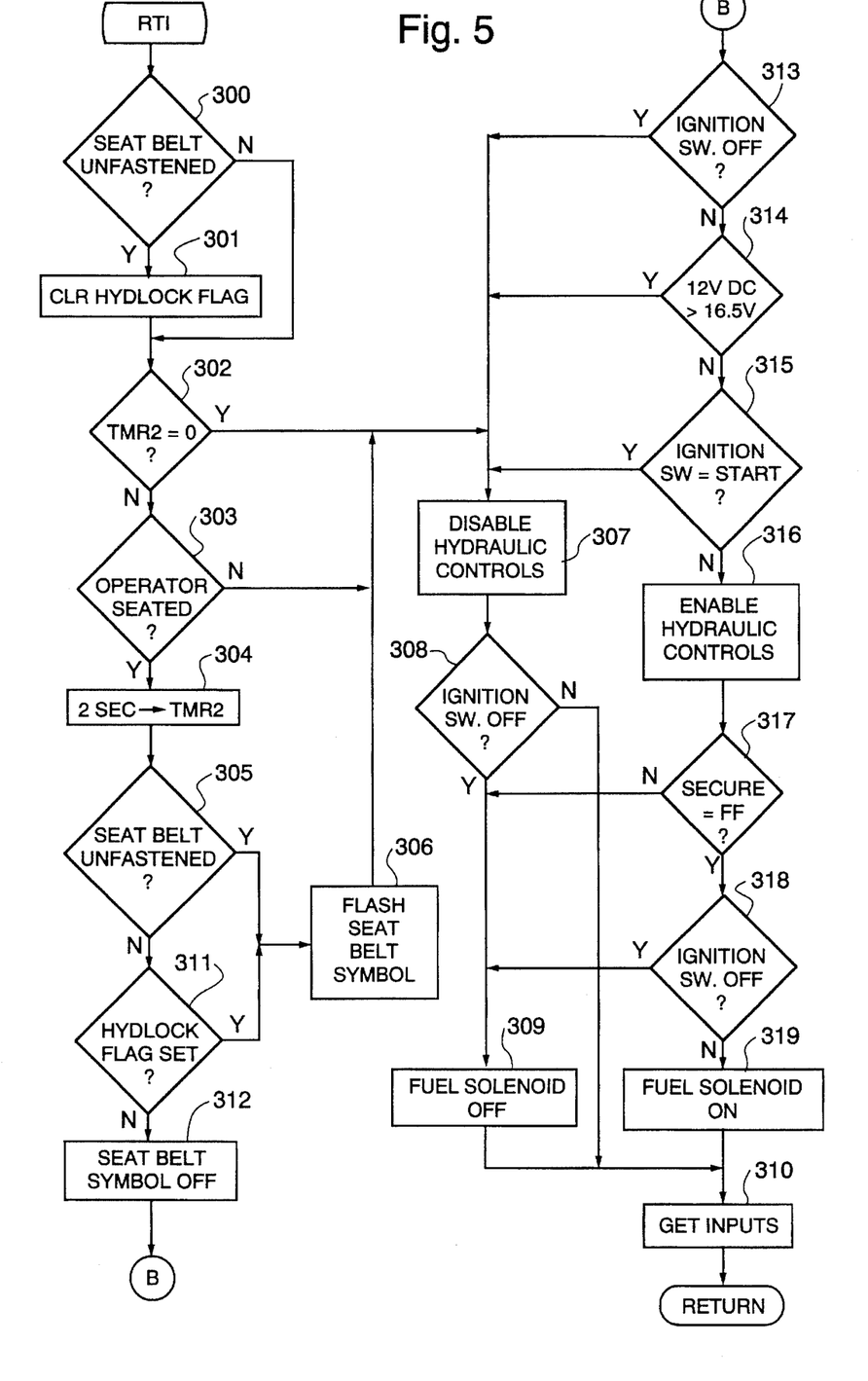
FIG. 5 is a flow diagram of a Real Time Interrupt routine executed by the microprocessor; and, FIG. 6 illustrates a portion of a Main routine executed by the microprocessor.

FIGS. 4A, 4B, 5 and 6 are flow diagrams of routines executed by microprocessor 106. When power is applied to the microprocessor it performs a power-on-reset, initializes various registers and timers, senses various switches and stores indications of their states and performs a check of the electrical circuits and display lamps. These portions of the Initialize routine are not necessary for an understanding of the invention and are not illustrated. As part of the Initialize routine the microprocessor executes the program steps shown in FIGS. 4A and 4B. Early in the Initialize Routine (step 201, FIG. 4A) a real time interrupt is enabled. As long as this interrupt is enabled the microprocessor program is interrupted every 4.1 ms and the Real Time Interrupt (RTI) routine of FIG. 5 is executed.

Figure 6:
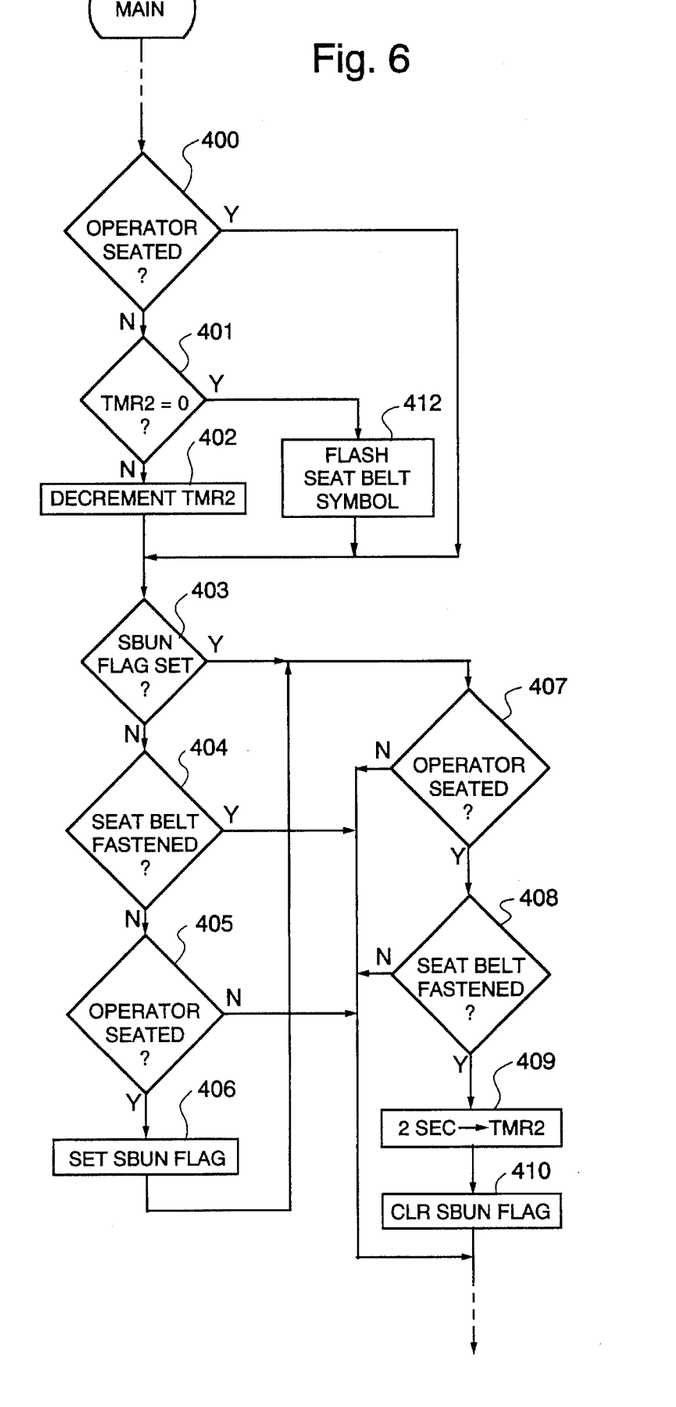

If the loader is unlocked (as subsequently described), or is locked and successfully unlocked during the Initialize routine, a Main routine (FIG. 6) is enabled and this routine is executed every 32.77 ms. The Main routine samples the states of various switches and the outputs of various sensors, updates the alphanumeric display 108 and symbol display lamps 109, and controls various functions such as engine preheating, cut-off of the engine fuel supply in the event of engine stall, and so forth. Only those portions of the Main rountine necessary for an understanding of the safety and security locks are illustrated in FIG. 6.

The interaction of the electrical circuits of FIGS. 2 and 3 and the microprocessor program of FIGS. 4A, 4B, 5 and 6 may best be explained by considering their response to specific sequences of operator actions.

NORMAL START AND RUN-UNLOCKED

Assuming that the operator is out of the cab, the run/service switch 52 is in the run position, the loader was not locked (as subsequently explained) before shut-down, and the seat belt switch 60 is open, the loader is started as follows. The operator enters the cab and sits in the operator's seat to close seat switches 56 and 58. Battery voltage is applied through the seat switches to the microprocessor 106 and transistor switch 93 (FIG. 3). Switch 93 produces an output signal to turn on regulator 94. The regulator applies +5 V to the circuits within EIC 50, including the microprocessor 106.

When +5 V is applied to microprocessor 106, it begins executing the Initialize routine (FIG. 4A) where, at step 200, the microprocessor sets a flag HYDLOCK. When this flag is set the microprocessor will not energize solenoids 74 and 76 and the armatures of the solenoids latch to the spools of the boom and bucket hydraulic control valves 75 and 77 thereby preventing movement of the boom and bucket. The flag HYDLOCK remains set only until it is determined that the seat belt is in an unbuckled state at the time the operator sits in the seat.

At step 201 a real time interrupt is enabled so that the program will be interrupted every 4.1 ms to execute the RTI routine of FIG. 5.

At step 202 the microprocessor tests the signal on lead 120 to determine if one of the seat switches 56, 58 is closed, that is, if the operator is seated. Under the assumed conditions the test at step 202 proves true so at step 204 the microprocessor determines if the ignition switch 80 is "on", that is in any position other than "off". Since the operator has not yet turned the ignition switch on, the test at step 204 proves false so the Open-Book switch 116 is tested at step 206 to determine if it has been pushed. This test also proves false so step 208 is executed to determine if the ignition switch in the ACC position. Since the ignition switch is still off, the test at step 208 proves false. At step 210 both switches 114 and 116 are tested and at step 212 the switch 116 is tested alone to determine if the operator has actuated both of the switches simultaneously or the switch 116 alone. If either test proves true, the program branches to a routine not relevant to the present invention. Under the assumed conditions both tests prove false so at step 214 a location SECURE in the $E^2PROM$ is tested to determine if the loader has been locked, that is, to determine if location SECURE holds a code other than FF. As subsequently explained, SECURE holds a two-digit locking code when the loader is locked and holds the value FF when the loader is unlocked. Since it is assumed that the loader is unlocked, the test at step 214 proves false. An interrupt is enabled at step 216 and the Initialize routine ends.

Once step 216 has been executed, the Main routine (FIG. 6) is executed once every 32.77 ms and the Main routine is interrupted once every 4.1 ms to execute the RTI routine of FIG. 5.

In the RTI routine, the status of the seat belt switch 60 is checked at step 300. Assuming the seat belt has not yet been buckled thus satisfying the requirement that the seat belt be in an unfastened state at the time the operator first sits in the seat, the microprocessor resets the flag HYDLOCK at step 301.

Step 302 tests a 2 sec timer TMR2 to determine if it has timed out. This timer is set to a value representing 2 seconds during initialization and will not have been decremented to zero the first time the RTI routine is executed. Step 303 then tests the status of the seat switches 56, 58 and assuming the operator is still seated TMR2 is reset to 2 seconds (step 304).

At step 305 the status of the seat belt switch 60 is tested again and since the operator has not yet buckled the seat belt the routine begins flashing (step 306) a lamp 109 located in back of a translucent seat belt symbol on the indicator panel.

The microprocessor then disables the boom and bucket hydraulic controls (step 307) by setting a signal on lead 122 so that solenoids 74 and 76 are de-energized. In the de-energized state the armatures of solenoids 74 and 76 engage the spools of the boom and bucket hydraulic control valves 75 and 77 so the valves cannot be moved to control the flow of hydraulic fluid to the boom and bucket. Under the assumed conditions, solenoids 74 and 76 are already de-energized at the time step 307 is reached thereby inhibiting the controls for moving the bucket and boom. At step 308, the ignition switch is tested and since it is assumed that the switch is still off the microprocessor sets an output signal on lead 126 which turns off fuel control solenoid 70 (step 309) so that fuel cannot flow to the engine. At step 310, the ignition, seat and seat belt switches are sampled and their status stored for use the next time the RTI routine is executed. A return is then made to the Main routine.

After 4.1 ms the Main routine is interrupted and the RTI routine is again executed. Assuming the operator remains seated with the seat belt unbuckled, steps 300–310 will be repeated before returning to the Main routine.

The operator may fasten the seat belt any time after step 301 is first executed.

On the first execution of the RTI routine after the operator fastens the seat belt, the test at step 300 determines that the seat belt switch 60 is closed so the program advances directly to step 302. Steps 302–304 are executed as previously described. However, step 305 determines that the seat belt is no longer unbuckled so the hydraulic lock flag HYDLOCK, is tested at step 309 to see if the flag is set. The flag was reset the first time step 301 was executed so the test at step 311 proves false. The seat belt indicator lamp 109 behind the seat belt symbol is turned off at step 312.

At step 313 the microprocessor samples the status of the ignition switch 80 and since it is still off the microprocessor maintains (step 307) the signal level on lead 122 to keep boom and bucket solenoids 74 and 76 de-energized and maintains (step 308) the signal on lead 126 to keep the fuel solenoid 70 off. After determining the state of the switches at step 310, a return is made to the Main routine.

Assuming the operator does nothing further, the microprocessor repetitively executes the Main routine, the Main routine being periodically interrupted to execute the RTI routine. On each execution of the RTI routine the microprocessor executes steps 300, 302–305, 311–313, 307 and 308 as described above.

The operator may now start the loader engine by turning the ignition switch 80 to the start position. However, the loader is provided with an engine preheat feature whereby when the ignition switch is first turned on the engine temperature is sensed, the time required to heat the engine to a starting temperature is calculated, the engine heaters 68 are turned on, and the calculated time is displayed and counted down on the display 108. Therefore, the operator should normally turn the ignition switch to the run position and wait until the calculated preheat time displayed has been counted down to zero before turning the ignition switch to the start position.

In FIG. 2, when the operator turns ignition switch 80 to the run position battery voltage is applied to fuel pump 104. Although not shown in FIG. 6, the Main routine samples the output of engine temperature sensor 72, calculates the required preheat time, energizes the preheat relay 60 so that battery voltage is applied to the heaters 68, counts down the calculated time and energizes the display 108 to display the time as it is counted down. The commonly owned and concurrently filed application of John G. Berger, et al. Ser. No. 08/348,911, now U.S. Pat. No. 5,469,819, entitled Adaptive Engine Preheat discloses and claims this engine preheat feature and reference may be made to that application for a full explanation thereof.

On the first execution of the RTI routine after the ignition switch is turned to the start position, when the microprocessor reaches step 313, the test shows that the ignition switch is not off. Step 314 is executed to check the DC voltage and if it is too high the program advances to step 307 to disable the hydraulic controls as a safety precaution. If the DC voltage does not exceed 16.5 V, the status of the ignition switch 80 is tested at step 315. Since the ignition switch is presently in the run position, the program advances to step 316 and sets an output signal on lead 122 to energize the boom and bucket solenoids 74 and 76 thereby enabling the boom and bucket hydraulic control valves 75 and 77 to be moved.

At step 317, location SECURE is tested for the value FF and since it is assumed that the loader is not locked the status of the ignition switch is tested at step 318. Since the ignition switch is not off, the microprocessor sets a signal on lead 126 (step 319) that passes over leads 128 and 130 to the hold coil of the fuel control solenoid 70. A return is then made to the Main routine after sampling the state of the ignition, seat and seat belt switches.

After the display 108 indicates that the engine preheat is completed, the operator turns the ignition switch to the start position. In FIG. 2, this connects battery voltage through contact c of run/service switch 52 to the coil of the start interlock relay 62. As relay 62 is energized, battery voltage is applied through contact b of the relay to the coil of start relay 54. As relay 54 is energized its contacts close so that battery voltage is applied to the coil of the starter solenoid 92. As solenoid 92 is energized its contacts close so that battery voltage is applied to the starter motor 91 and the motor turns the loader engine 73.

When the contacts of starter solenoid 92 close, battery voltage is also applied to the pick-up coil of fuel solenoid 70 so that fuel is supplied to the engine.

On the next execution of the RTI routine after the ignition switch is turned to the start position, steps 300, 302–305, and 311–314 are executed as described above. However, at step 315, the test proves true since the ignition switch is now in the start position. The output signal on lead 122 is terminated (step 307) so that solenoids 74 and 76 are de-energized to disable the bucket and boom hydraulic controls during starting. Since the ignition switch is not off (step 308) the routine jumps to step 310 to get the status of the switches before a return is made to the Main routine.

When the loader engine starts, the operator releases the ignition key and the ignition switch returns to the run position. In FIG. 2, the coil of interlock relay 62 is no longer energized from the start position of the ignition switch so the contacts of the interlock relay open. This removes voltage from the coil of start relay 54 and the relay contacts open thereby removing energizing voltage from the coil of starter solenoid 92. When the starter solenoid is de-energized its contacts open thereby stopping the starter motor 91 and terminating the voltage on the pick coil of the fuel control solenoid 70. However, the solenoid is held by the signal produced by the microprocessor on lead 126 so fuel continues to flow to the engine.

On the first execution of the RTI routine after the ignition switch returns to the run position, the microprocessor executes steps 300, 302–305 and 311–314 as described above. However, since the ignition switch is no longer in the start position the test at step 315 proves false. The microprocessor sets an output signal (step 316) on lead 122 to energize solenoids 74 and 76 thereby enabling the boom and bucket hydraulic control valves 75 and 77 to be moved.

The test at step 317 proves true because the loader has not been locked and the test at step 318 proves false because the ignition switch is in the run position. Therefore, at step 317 microprocessor 106 maintains the signal on lead 126 so that the fuel solenoid 70 is energized to permit fuel flow to the engine.

This completes a normal start-up operation. As long as the operator remains seated, keeps the seat belt buckled, and does not turn the ignition switch off, the loader engine continues to run, the boom and bucket hydraulic control valves 75 and 77 are enabled, and the microprocessor repetitively executes step 300, 302–305, 311–319 and 310 of the RTI routine every 4.1 ms.

If the operator should unbuckle the seat belt, the loader engine will continue to run but the boom and bucket hydraulic controls are disabled. The unbuckled state of the seat belt is sensed again at step 305 and the seat belt symbol is flashed at step 306. The signal on lead 122 is terminated (step 307) to thereby prevent movement of the boom and bucket.

By rebuckling the seat belt the control of the boom and bucket may be restored. On the next execution of the RTI routine after rebuckling, the test at step 305 proves false so steps 311–319 and 310 are executed as described above with step 316 energizing solenoids 74 and 76 to thereby enable the hydraulic control of the boom and bucket.

If the operator should remove his weight from the seat for an interval of less than two seconds the loader engine will continue to run but the boom and bucket hydraulic controls are disabled during the interval the operator is off the seat. However, if the operator should lift his weight from the seat for more than two seconds the boom and bucket controls are permanently disabled. In the latter case the boom and bucket controls may be restored only if the operator unbuckles the seat belt, and then rebuckles the seat belt while seated in the seat.

As previously indicated, TMR2 is used to time the two second interval and as long as the operator remains seated TMR2 is reset to two seconds at step 304 of the RTI routine. TMR2 is decremented each time the Main routine (FIG. 6) is executed.

Assume that the operator is seated with the seat belt buckled and the boom and bucket hydraulic controls are enabled. In the Main routine, the test of the seat switches at step 400 proves true so the routine advances to step 403 where a flag SBUN is tested. This flag is set only when the operator is seated and the seat belt is unbuckled so the test at step 403 proves false. The seat belt switch is tested at step 404 and since the seat belt is fastened the test proves true. The Main routine then continues with operations not relevant to the present invention. Meanwhile, the RTI routine keeps the boom and bucket hydraulic controls enabled as previously described.

Assume now that the operator lifts his weight from the seat so that seat switches 56, 58 are open. In the RTI routine, this is detected at step 303 and the boom and bucket hydraulic controls are disabled at step 307. In the Main routine, step 400 detects that the operator is not seated so TMR2 is tested at step 401. Initially TMR2 will not be zero so TMR2 is decremented (step 402).

The SBUN flag is not set (step 403) and the seat belt is still fastened so the Main routine continues with other matters. The Main routine thus executes steps 400–404 as long as the operator is out of the seat with TMR2 being decremented each time step 402 is executed.

If, prior to expiration of the 2 sec interval, the operator again seats himself, the closure of the seat switches is detected at step 303 of the RTI routine, TMR2 is reset to time a 2 sec interval (step 304) and the boom and bucket hydraulic controls are enabled (step 316). In the Main routine, closure of the seat switches is detected at step 400 and the routine branches to step 403 so that TMR2 is no longer decremented.

If the operator is off the seat for more than two seconds the repeated executions of steps 402 decrement TMR2 to 0. In the RTI routine TMR2 is sensed at step 302 before the seat switches are sensed (step 303) hence the boom and bucket hydraulic controls cannot be reenabled if the operator merely returns to the seat. Meanwhile, in the Main routine, the seat belt symbol is flashed at step 412 on each execution of the routine after TMR2 is decremented to zero.

The boom and bucket hydraulic controls may be reenabled by the operator by unbuckling the seat belt and rebuckling it while seated in the seat. When the operator reseats himself, steps 400, 403 and 404 of the Main routine are executed as previously described. When the seat belt is unfastened, the new state of the seat belt switch is detected at step 404 so the seat switches are tested (step 405). The operator is seated so the SBUN flag is set (step 406). Since the operator is seated the test at step 407 proves true but because the seat belt is unfastened the test at step 408 proves false. The routine then branches from step 408 and continues with other operations.

Since the SBUN flag is now set, steps 400, 403, 407 and 408 are executed each time the Main routine is executed. When the operator refastens the seat belt, the new status of the seat belt switch is detected at step 408. TMR2 is reset to time a 2 sec interval (step 409) and the SBUN flag is cleared (step 410). In the RTI routine, step 302 no longer detects that TMR2 is zero and since the operator is seated (step 303) and the seat belt is not unfastened (step 305) the boom and bucket hydraulic controls are enabled (step 307).

Anti-Theft Locking

Briefly, an operator may secure the loader against theft by carrying out the following sequence of steps.

1. The boom and bucket are lowered to the ground and the bucket tilted into contact with the ground so that it will prevent movement of the loader. The reason for this is that the loader engine may be started and will continue to run when the run/service switch is in the service position although the boom and bucket cannot be moved.

2. The ignition switch is turned off.

3. The seat belt is unbuckled and the operator lifts his weight from the seat.

4. The Open Book switch 116 is pushed and held while the operator reseats himself in the seat.

5. The Open Book switch 116 is released.

6. The ignition key is turned to the run position.

7. The switches 114 and 116 are actuated to enter a security code.

8. The ignition key is turned off.

Assume that the loader engine is running and the boom and bucket hydraulic controls are enabled. The operator lowers the boom and tilts the bucket to engage the ground. The ignition switch 80 is then turned to the off position. On the next execution of the RTI routine, the status of the ignition switch is sensed at step 311. The signal on lead 122 is terminated to disable the hydraulic controls (step 307) and the signal on lead 126 is terminated (step 318) so that the fuel solenoid 70 is de-energized. Within a few seconds the engine stops running for lack of fuel. However, the EIC is still powered because the seat belt switch 60 and seat switches 56 and 58 are still closed.

Next, the operator unbuckles the seat belt and lifts his weight from the seat. This opens switches 56, 58 and 60. With the switches 56, 58 and 60 open and the ignition switch off, the microprocessor powers down by terminating the signal on lead 132 to thereby turn off transistor switch 93. The switch 93 in turn shuts down regulator 94 so that voltage is no longer applied to the microprocessor. At this point the loader is completely shut down.

To set the anti-theft lock, the operator now actuates the Open-Book switch 116 and holds it actuated as he reseats himself in the operator's seat. As the operator sits in the seat, seat switches 56 and 58 close to provide power to the EIC as previously explained and the microprocessor begins execution of the Initialize routine (FIG. 4A). The hydraulic lock flag is set (step 200) and the real time interrupt is enabled (step 201) so that the RTI routine is periodically executed. The operator is in the seat (step 202) and the ignition key is off (step 204) so the microprocessor advances to step 206 where the status of the Open-Book switch 116 is tested. The operator is still actuating the switch so the program advances to step 222 where the microprocessor sends signals to the controllers 110 to cause the alphanumeric display 108 to display "LOC___" as a prompt for the operator to enter any 2-digit security code between 00 and 99.

The operator may now release the Open-Book switch 116. The display 108 continues to display the visual prompt and the microprocessor waits at step 224 since the ignition switch is still off.

Next, the operator turns the ignition switch to the run position, being careful not to turn the switch through the run position to the start position. The microprocessor advances to step 226 and since the ignition switch is now on, step 228 is executed. Step 228 senses the state of the switches 114 and 116, updates the display 108 to show the value of the security code as it is entered, and saves the updated value of the entered code at a location memory location LOCK-CODE. Steps 226 and 228 are repeated as long as the ignition switch is on. During this time the operator actuates switch 114 to enter one digit of the security code and actuates switch 116 to enter the other second digit.

After the security code has been entered, the ignition switch is again turned off so the microprocessor advances to step 230 where the value in a location SECURE in the E²PROM memory is tested. SECURE is the memory location which stores the security code (00–99) when the system is locked and it is stored in the E²PROM so that it will not be lost when power is removed from the EIC. When the system is unlocked, SECURE stores the unlock code having the value FF. Under the assumed conditions, location SECURE stores the value FF indicating no lock is in effect so the test at step 230 proves false. The code entered in LOCKCODE at step 228 is then tested (step 232) to determine if it is a valid code, that is, if it has a value between 00 and 99. Assuming the code is valid, it is stored in SECURE (step 234).

The loader is now locked and may be unlocked only by entering the same security code or a master code as subsequently described.

If step 232 determines that an invalid code has been entered, or after a valid code is stored at step 234, the Initialize routine ends. A watchdog routine causes the microprocessor to return to step 200 if the operator remains seated and executes steps 202, 204, 206, 216 and 218 as previously described. The operator may make another attempt to enter a valid security code. However, if the operator gets out of the seat and unbuckles the seat belt the microprocessor terminates the signal on lead 132 and power to the EIC is removed because the ignition switch is off.

Anti-Theft Unlocking

If a security code is stored in SECURE before power is removed from the EIC, that same security code must be entered again before the boom and bucket are enabled. Although a prospective thief may start the loader engine without entering any security code, the engine fuel solenoid is de-energized so that the engine stops running after a few seconds because of lack of fuel.

The loader is unlocked only if the operator follows a specific sequence of actions. Upon entering the cab he must actuate the Open-Book switch 116 before sitting in the seat. After sitting in the seat, he must turn ignition switch 80 to the run position, actuate switches 114 and 116 to enter the same 2-digit security code used to lock the system (or a master code), and turn the ignition switch off. This sequence of events replaces the security code in SECURE with the "unlocked" code FF and the operator may now start the engine as described above for a normal start and run, unlocked.

Assume that the operator enters the cab and actuates the Open-Book switch 116. Nothing happens at this time because no power is applied to the microprocessor. When the operator sits down, the seat switches 56, 58 close and power is applied to the microprocessor so that it begins execution of the Initialize routine (FIG. 4A). The hydraulic system lockout flag is set (step 200) and the real time interrupt is enabled (step 201) to enable running of the RTI routine of FIG. 5 every 4.1 ms. The ignition key should be off (step 204) so the Open Book switch 116 is tested at step 206. The operator must still be pressing the switch 116 at this time if unlocking is to occur. If the test at step 206 determines that the switch 116 is actuated, the microprocessor sends signals to display controllers 110 so that the message "LOC___" is displayed (step 222) on the display 108. The program then advances to step 224.

At step 224 the microprocessor senses the state of the ignition switch 80 and since the switch is now off the microprocessor waits at step 224 until the operator turns the ignition switch to the run position. When this happens the test at step 224 proves true and the microprocessor advances to step 226. Since the ignition switch is now on, the microprocessor repetitively executes steps 226 and 228 as long as the ignition switch remains on. During this time the operator may actuate switches 114 and 116 to enter the security code. By depressing and holding the switch 114, the most significant digit of the security code is incremented by one each second at step 228 and the updated value is displayed on the display 108. Similarly, the least significant digit of the security code is entered by actuation of switch 116. The entered value of the security code is saved at location LOCKCODE.

When the display 108 shows the security code the operator wishes to enter, (the same code he previously used to lock the system) he turns the ignition switch off and the microprocessor advances to step 230. At step 230, the location SECURE is checked to determine if the system is locked, that is, to determine if SECURE holds some value other than the unlock code FF. Since the assumption is that the system is locked, the test at step 222 proves true and the routine advances to step 238.

At step 238, a first comparison is made to determine if the code entered at step 228 and saved at LOCKCODE is equal to the code in SECURE. If the two are equal, the security code in SECURE is replaced with the "unlocked" code FF (step 240).

If the first comparison at step 238 shows that the code entered at step 228 is not equal to the code in SECURE then a second comparison is made between the code entered at step 228 and a master code stored at location MASTER in the E²PROM. The master code is set in MASTER at the factory and varies according to the loader model and serial number. In the event the operator should forget what code he used to lock the system he may contact the dealer who sold him the loader and obtain the master code. He would then follow the normal unlocking procedure except that he would enter the master code at step 228. If the correct master code is entered, this fact is determined by the second comparison at step 238 and the lock code in SECURE, whatever it may be, is replaced with the unlocked code FF at step 240.

After step 240 is executed, the routine returns to step 200 and the operator may proceed with starting the loader as though it was never locked. If the incorrect code is entered, the operator may try again by rising out of the seat, actuating the switch 116, and reseating himself while holding the switch actuated.

Unauthorized Starting

If someone should attempt to start and operate the loader when it is locked, the engine will start but the bucket and boom controls remain disabled and, after a short interval the engine stops. Repeated startings of the engine will call attention to a would-be thief and, because the bucket is engaging the ground, the loader is difficult to move when the engine will not run steadily and the bucket cannot be raised.

Assume that someone enters the cab and follows the same procedure as described above for a normal start and run but the loader has been locked and the lock has not been removed. When the operator sits in the seat, power is applied to the EIC and the microprocessor begins the Initialize routine as previously described. The hydraulic system lock flag HYDLOCK is set at step 200 and the RTI is enabled at step 201 so that the RTI routine is executed every 4.1 ms.

In FIG. 4A, the microprocessor executes steps 202, 204, 206, 208, 210 and 212 as for a normal start-up. However, at step 214 the test of SECURE shows that the loader is locked so the microprocessor branches to step 218 where it sets an output signal on lead 126 to de-energize the fuel solenoid 70. The microprocessor then sets an output signal on lead 122 (step 220) to de-energize solenoids 74 and 76 thereby disabling the hydraulic controls for the boom and bucket.

After the hydraulic controls are locked, the microprocessor sends signals to controllers 110 to cause "LOC___" to be displayed on the display 108 as a prompt to the operator to enter the security code. The Initialize routine then waits for the ignition switch to be turned on (step 224) and then off (step 220) and the security code entered (step 228).

If the operator turns the ignition switch on, then off, then on again, the program advances to step 230. Since SECURE holds a locking code, the routine advances to step 238 where the code entered at step 228 (if any was entered) is compared to the code in SECURE and to the master code. If an incorrect code was entered at step 221, or no code was entered, the test at step 238 proves false. If the operator is in the seat, the routine returns to step 200 and a further attempt may be made to unlock the loader.

Meanwhile, the RTI routine is being executed every 4.1 ms. If the operator should buckle the seat belt and turn the ignition switch to the start position, the RTI routine will be executed as for an unlocked start-up until that point is reached where the operator releases the ignition switch and it moves from the start to the run position. When this happens, step 317 of the RTI routine detects that SECURE still holds a locking code. Therefore, the microprocessor continues to produce an output signal on lead 120 to turn off the fuel solenoid 70.

From the foregoing description it is seen that the present invention provides a novel apparatus which positively encourages an operator to use the seat belt and makes it more inconvenient for an operator to defeat the safety restraints than to use them normally. This is accomplished by inhibiting the boom and bucket hydraulic controls 75 and 77 so that the boom and bucket cannot be used unless the operator has followed a specific sequence of steps in which the seat belt must be buckled only after the operator is seated. Theft or unauthorized use of the loader is impeded by positioning the bucket in engagement with the ground and then electrically locking the boom and bucket against movement by storing a locking code, the lock being removable only by entering the locking code again.

While a specific preferred embodiment of the invention has been described in detail by way of illustration, it will be understood that various modifications and substitutions may be made in the described embodiment without departing from the spirit and scope of the invention as defined by the appended claims.

We claim:

1. A loader having a boom and bucket, hydraulic controls for controlling movement of said boom and bucket, and an interlock system, said interlock system comprising:

a programmable controller including a non-volatile memory having a storage location therein for selectively receiving and storing a locking security code or an unlock security code;

switch means for entering an enterable security code into said programmable controller, said programmable controller including first means responsive to said switch means and to a locking security code in said storage location for replacing said locking security code in said storage location with an unlock security code when said enterable security code matches said locking security code in said storage location, and second means responsive to said switch means and to said unlock security code in said storage location for storing said enterable security code in said storage location as a locking security code when said storage location stores said unlock security code at a time when said enterable security code is entered into the programmable controller; and, control means for inhibiting said hydraulic controls to prevent movement of said boom and bucket as long as said locking security code is stored in said storage location, said control means enabling said hydraulic controls to permit movement of said boom and bucket when said unlock security code is in said storage location.

2. A loader as claimed in claim 1 wherein said loader is powered by a diesel engine, said interlock system including means responsive to said programable controller for blocking flow of fuel to said engine when said engine is started and said locking security code is stored in said storage location.

3. An interlock system as claimed in claim 1 and further comprising a seat switch actuated when an operator sits in an operator seat for energizing said programmable controller to begin execution of a program, and a display means for displaying a message prompting an operator to enter a security code, said programmable controller being responsive to said seat switch and said locking security code in said storage location for causing said display means to display said message.

4. An interlock system as claimed in claim 3 wherein said non-volatile memory permanently stores a master code and the programmable controller includes means for replacing said locking security code in said storage location with said unlock security code when, during display of said message, said switch means are actuated to enter into the programmable controller said enterable security code matching said master code.

5. A loader as claimed in claim 1 and further comprising a manually actuated open book switch, said programmable controller being responsive to said switch means and said open book switch to replace said unlock security code in said storage location with said locking security code only if said open book switch is actuated and released prior to actuation of said switch means to enter said enterable security code.

6. A loader as claimed in claim 5 and further comprising a seat switch actuated when an operator is seated in the loader, said programmable controller being responsive to said switch means to replace said unlock security code only if the operator actuates the open book switch while unseated and releases the open book switch after being seated.

7. A loader as claimed in claim 6 and further comprising an ignition switch, said programmable controller being responsive to said switch means, said open book switch and said ignition switch to replace said unlock security code in said storage location only if said ignition switch is in an off position when said open book switch is actuated and is on when said switch means is actuated.

8. A loader as claimed in claim 1 and further comprising a manually actuated open book switch, said programmable controller being responsive to said switch means and said open book switch to replace said locking security code in said storage location with said unlock security code only if said open book switch is actuated and released prior to actuation of said switch means to enter said enterable security code.

9. A loader as claimed in claim 8 and further comprising a seat switch actuated when an operator is seated in the loader, said programmable controller being responsive to said switch means to replace said locking security code only if the operator actuates the open book switch while unseated and releases the open book switch after being seated.

10. A loader as claimed in claim 9 and further comprising an ignition switch, said programmable controller being responsive to said switch means, said open book switch and said ignition switch to replace said locking security code in said storage location only if said ignition switch is in an off position when said open book switch is actuated.

11. In an off-road vehicle having an actuator which must be energized to permit unrestricted movement of the vehicle, an interlock circuit for controlling energization of said actuator, said interlock circuit comprising:

a controller including a non-volatile memory having a storage location therein for selectively receiving and storing a locking security code or an unlock security code;

manually operable switch means for entering an enterable security code into said controller, said controller including first means responsive to said switch means and to a locking security code in said storage location for replacing said locking security code in said storage location with an unlock security code when said enterable security code matches said locking security code in said storage location, and second means responsive to said switch means and to said unlock security code in said storage location for storing said enterable security code in said storage location as a locking security code when said storage location stores said unlock security code at a time when said enterable security code is entered into said controller; and, control means for inhibiting energization of said actuator as long as said locking security code is stored in said storage location, said control means enabling energization of said actuator when said unlock security code is in said storage location.

12. An interlock circuit as claimed in claim 11 wherein said controller includes means for determining if said enterable security code has a value falling within a predetermined range of values, and said second means is enabled to replace said unlock security code in said storage location with said enterable security code when the value of said enterable security code is equal to any value within said range.

* * * * *